US012773368B2

(12) United States Patent
Park et al.

(10) Patent No.: US 12,773,368 B2

(45) Date of Patent: Oct. 27, 2026

(54) WALKING ASSISTANCE SYSTEM FOR VISUALLY IMPAIRED PERSON AND METHOD THEREOF

(71) Applicant: LG ELECTRONICS INC., Seoul (KR)

(72) Inventors: Juhnho Park, Seoul (KR); Changkyoung Yoon, Seoul (KR); Byungjin Kang, Seoul (KR); Manri Cheon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/880,369

(22) PCT Filed: Jul. 1, 2022

(86) PCT No.: PCT/KR2022/009510

§ 371 (c)(1),
(2) Date: Dec. 31, 2024

(87) PCT Pub. No.: WO2024/005243

PCT Pub. Date: Jan. 4, 2024

(65) Prior Publication Data

US 2025/0387286 A1 Dec. 25, 2025

(51) Int. Cl.
*A61H 3/06* (2006.01)

(52) U.S. Cl.
CPC ............ *A61H 3/061* (2013.01); *A61H 3/068* (2013.01); *A61H 2003/063* (2013.01); *A61H 2003/065* (2013.01); *A61H 2201/5043* (2013.01); *A61H 2201/5048* (2013.01); *A61H 2201/5064* (2013.01); *A61H 2201/5069* (2013.01); *A61H 2201/5084* (2013.01); *A61H 2201/5092* (2013.01); *A61H 2201/5097* (2013.01)

(58) Field of Classification Search
None
See application file for complete search history.

(56) References Cited

U.S. PATENT DOCUMENTS 11,726,484 B1 * 8/2023 Gerdes ................. G05D 1/0231 701/26
2020/0043368 A1 * 2/2020 Brathwaite .......... G09B 21/007

FOREIGN PATENT DOCUMENTS

CN 112891162 A 6/2021
JP 2008-259882 A 10/2008
KR 10-2015-0097043 A 8/2015
KR 20150097043 A * 8/2015 ............ A61H 3/061

(Continued)

*Primary Examiner* — Carlos Garcia

(74) *Attorney, Agent, or Firm* — Birch, Stewart, Kolasch & Birch, LLP

(57) ABSTRACT

An embodiment of the present disclosure provides a walking assistance system for a visually impaired person, the system comprising: smart glasses wearable by a user and including a camera, an image processor, a sound output unit, and a first wireless communication part; and a stick including a vibrator and a second wireless communication part, wherein: the camera acquires image information on a forward path; and the image processor analyzes the type of forward path and the types of obstacles on the basis of the image information, generates guidance information corresponding to the type of forward path and the types of obstacles, and outputs the guidance information through the sound output unit.

8 Claims, 11 Drawing Sheets

(56) References Cited

FOREIGN PATENT DOCUMENTS

| | | | | | |
|---|---|---|---|---|---|
| KR | 10-2015-0140807 | A | | 12/2015 | |
| KR | 20150140807 | A | * | 12/2015 | .............. G06F 3/011 |
| KR | 102113560 | B1 | * | 5/2020 | ............. A61H 3/061 |

* cited by examiner

WALKING ASSISTANCE SYSTEM FOR VISUALLY IMPAIRED PERSON AND METHOD THEREOF

CROSS REFERENCE TO RELATED APPLICATIONS

This application is the National Phase of PCT/KR2022/009510 filed on Jul. 1, 2022, which is hereby expressly incorporated by reference into the present application.

TECHNICAL FIELD

The present disclosure relates to a walking assistance system for the visually impaired, including smart glasses and a cane and to a walking assistance method for the visually impaired.

BACKGROUND ART

When visually impaired people move, they recognize surrounding obstacles in a manner of hearing sound and feeling touch by touching and tapping terrain they are walking on using a cane specifically designed for the visually impaired. This is a method of using a cane, called a touch technique or a diagonal technique, in which one walks while checking a road surface and the presence of an obstacle by tapping the road surface using the cane or holding the cane diagonally in the hand and tapping the road surface.

In addition to the above method, the visually impaired sometimes receive assistance through guide dogs. In this way, a guide dog or a cane is an essential item for mobility of visually impaired people.

There are about 250,000 visually impaired people in Korea. Some of the visually impaired people are provided with guide dogs to achieve the purpose of safe walking, but there are less than 100 guide dogs for the visually impaired in the country, so the supply is very low compared to the demand. For this reason, it is known that conditions for receiving a guide dog are very strict. In addition, it is said that it costs about 200 million Won to raise one guide dog for the visually impaired.

In addition, judging by sound and feeling felt by directly tapping a road surface using the cane may be used effectively only after becoming visually impaired and training other senses to a certain extent, and sensing speed is slow and inconvenient. Even if the guide dog is used, it is difficult to act together in public places, and there are limitations in understanding a complex signal system on the road or sensing directionality.

DISCLOSURE

Technical Problem

The present disclosure aims to provide a walking assistance system for the visually impaired, including smart glasses and a cane and a walking assistance method for the visually impaired a method thereof to solve the above problems.

Technical Solution

According to an embodiment of the present disclosure, provided herein is a walking assistance system for the visually impaired. The walking assistance system includes smart glasses wearable by a user, including a camera, an image processor, an audio output part, and a first wireless communication part; and a cane including a vibrator and a second wireless communication part. The camera is configured to acquire image information about a forward path. The image processor is configured to analyze a type of the forward path and a type of an obstacle based on the image information, generate guidance information related to the type of the forward path and the type of the obstacle, and output the guidance information through the audio output part.

The image processor may generate a virtual Braille block based on a result of analysis. The first wireless communication part may transmit recognition information to the cane based on recognition of the cane detected through the camera on the generated virtual Braille block. The vibrator of the cane may output vibration based on the recognition information.

The image processor may generate the virtual Braille blocks as a path that avoids an obstacle among walkable paths in the forward path.

The smart glasses may further include an inertial measurement unit (IMU) sensor. The IMU sensor may sense three-dimensional position information and rotation information of the camera. The image processor may generate the virtual Braille block based on the three-dimensional position information and rotation information of the camera sensed by the IMU sensor.

The smart glasses may output an alarm through the sound output part based on gaze of the user deviating from a first range by a first angle or more based on the three-dimensional position information of the camera.

The image processor may generate the virtual Braille block by coloring the type of the forward path based on a predetermined criterion.

The image processor may analyze the type of the obstacle based on a bounding box related to the obstacle.

The smart glasses may receive global positioning system (GPS) information from an external server through the first wireless communication part and generate the virtual Braille block based on the GPS information.

The walking assistance system for the visually impaired may further include a smart device including a third wireless communication part and an environment setting part. The user may set functions of the smart glasses and the cane through the environment setting part, and the smart device may transmit the set functions to the smart glasses and the cane through the third wireless communication part.

According to another embodiment of the present disclosure, provided herein is a walking assistance method for the visually impaired in a walking assistance system for the visually impaired. The walking assistance system includes smart glasses wearable by a user, which include a camera, an image processor, an audio output part, and a first wireless communication part, and a cane, which includes a vibrator and a second wireless communication part. The walking assistance method includes acquiring image information about a forward path through the camera; analyzing a type of the forward path and a type of an obstacle based on the image information; generating guidance information related to the type of the forward path and the type of the obstacle; and outputting the guidance information through the audio output part.

Advantageous Effects

According to one embodiment of the present disclosure, there is an advantage in that a walking assistance system is usable while continuing to use a touch technique mainly used by the visually impaired.

Effects that may be obtained from the present disclosure are not limited to the effects mentioned above, and other effects not mentioned are able to be clearly understood by those skilled in the art in the technical field to which the present disclosure belongs from a description below.

BEST MODE

Description will now be given in detail according to exemplary embodiments disclosed herein, with reference to the accompanying drawings. For the sake of brief description with reference to the drawings, the same or equivalent components can be provided with the same reference numbers, and description thereof will not be repeated. In general, a suffix such as "module" and "unit" can be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. can be used herein to describe various elements, these elements should not be limited by these terms. These terms are generally only used to distinguish one element from another.

It will be understood that when an element is referred to as being "connected with" another element, the element can be directly connected with the other element or intervening elements can also be present. In contrast, when an element is referred to as being "directly connected with" another element, there are no intervening elements present.

A singular representation can include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps can likewise be utilized.

Even if the visually impaired cannot see well, they should avoid obstacles and move safely on a road surface. The present disclosure proposes a walking assistance system and method for the visually impaired using smart glasses, a cane, and a smart device in response to mobility needs of the visually impaired.

In particular, according to results of interviews with the visually impaired, the visually impaired do not want directions to be given through a speaker, etc. output from the cane. Accordingly, the present disclosure aims to provide the visually impaired with guidance through a method of generating virtual Braille blocks using augmented reality (AR) technology and recognizing the cane.

Figure 1:
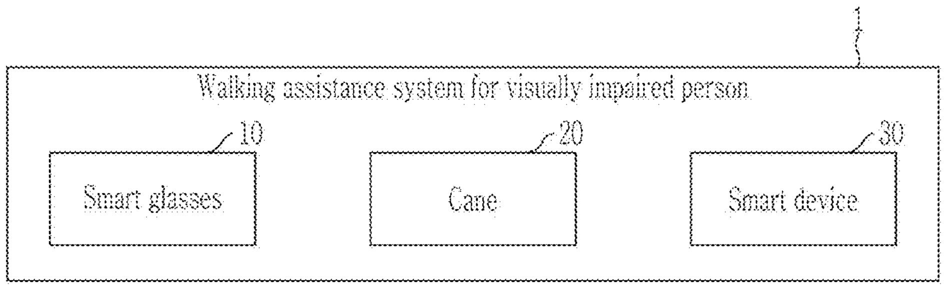
FIG. 1 is a diagram illustrating components of a walking assistance system for the visually impaired according to an embodiment of the present disclosure.

FIG. 1 is a diagram illustrating components of a walking assistance system for the visually impaired according to an embodiment of the present disclosure.

Referring to FIG. 1, a walking assistance system 1 for the visually impaired may include smart glasses 10, a cane 20, and a smart device 30.

The smart glasses 10 may include a camera, an image processor, an audio output part, and a first wireless communication part.

In an embodiment of the present disclosure, the camera may obtain image information about a forward path. The image processor may analyze the type of the forward path and the type of an obstacle based on the obtained image information and generate guidance information corresponding to the type of the forward path and the type of the obstacle. Thereafter, guidance information may be output through the audio output part.

In one embodiment of the present disclosure, the image processor may generate a virtual Braille block based on analysis results of the type of the forward path and the type of the obstacle. When the cane 20 detected by the camera is recognized on the generated virtual Braille block, the first wireless communication part may transmit the recognition information to the cane 20. This will be described in detail in FIG. 2.

The cane 20 may include a vibrator and a second wireless communication part. The cane 20 may output vibration through the vibrator based on the recognition information received through the second wireless communication part. This will be described in detail in FIG. 3.

The smart device 30 may include a third wireless communication part and an environment setting part. A user may set functions of the smart glasses 10 and the cane 20 through the environment setting part. The smart device 30 may transmit the set functions to the smart glasses 10 and the cane 20 through the third wireless communication part. This will be described in detail in FIG. 4.

According to the present disclosure, the smart glasses, the cane, and the smart device may be connected through wireless communication, the type of the forward path and the type of the obstacle may be recognized using the camera, and it may be determined whether the cane is recognized on the virtual Braille block generated using the recognized information.

Therethrough, the visually impaired who walk independently may be notified of the road surface and the obstacle, thereby eliminating the fear of the unseen ahead to provide psychological stability and improve safety and increasing walking speed.

Figure 2:
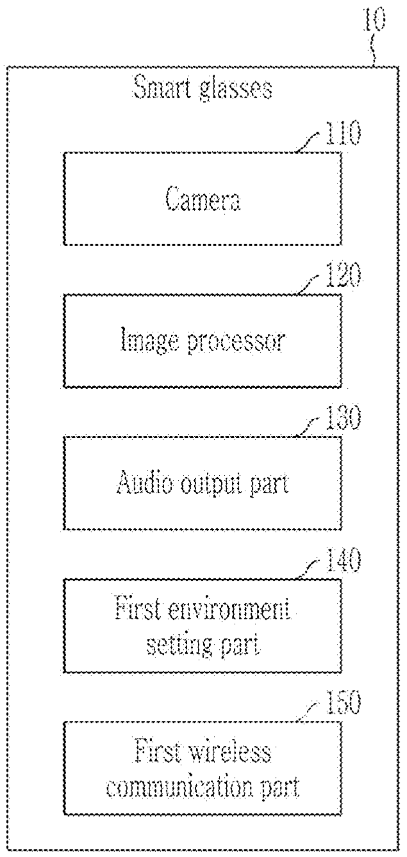
FIG. 2 is a diagram illustrating components of smart glasses according to an embodiment of the present disclosure.

FIG. 2 is a diagram illustrating components of smart glasses according to an embodiment of the present disclosure. Hereinafter, a redundant description that overlaps with the above description will be omitted.

Referring to FIG. 2, the smart glasses 10 may include a camera 110, an image processor 120, an audio output part 130, a first environment setting part 140, and a first wireless communication part 150. In particular, the smart glasses 10 for a visually impaired person generally include only essential components for operation in order to reduce the weight thereof because a display is meaningless.

The camera 110 may obtain video information or image information about a forward path. More specifically, the camera 110 may obtain an image about the forward path according to a gaze direction of the smart glasses 1 while the visually impaired person moves. For this purpose, the camera 110 may include a charge coupled device (CCD) sensor or a complementary metal oxide semiconductor (CMOS) sensor as an image sensor.

The image processor 120 may analyze the type of the forward path and the type of an obstacle by applying a machine learning algorithm to the video information or image information obtained from the camera 110. The image processor 120 may recognize the type of the forward path and the type of the obstacle and generate guidance information corresponding to the type of the forward path and the type of the obstacle. In particular, the present disclosure distinguishes a road surface, not just the obstacle, as a recognition target, so that the visually impaired may use the road more safely. That is, the road surface of the front path that the visually impaired person wants to walk on may be distinguished into a roadway, a sidewalk, a crosswalk, etc., and may be recognized through machine learning so that road surface information may be transmitted.

In one embodiment of the present disclosure, the image processor 120 may generate a virtual Braille block based on results of analyzing the type of the forward path and the type of the obstacle. In one embodiment, the image processor 120 characteristically generates the virtual Braille block as a path that avoids the obstacle by considering the obstacle among walkable paths in analyzed forward paths. Here, the virtual Braille block is generated by the image processor 120 but is virtual. Since the smart glasses do not include a display, the virtual Braille block is not actually output.

In one embodiment, the image processor 120 may use posture information (three-dimensional (3D) position information and rotation information) of the camera 110 using a sensor such as an inertial measurement unit (IMU, not illustrated) sensor in order to accurately synthesize the virtual Braille block according to image information input in real time. In this case, the traveling direction of the user may be set to a direction in which the user gazes, and in the case of using the IMU sensor, the traveling direction of the user may be determined and set based on information detected by the IMU sensor.

In one embodiment, when the IMU sensor is used, the image processor 120 may detect the direction of movement using an acceleration sensor and a gyroscope sensor in a state in which continuous movement is possible and may distinguish and determine the direction in which the user is moving and the direction in which the user gazes (the direction actually detected by the camera 110). This is because, if the IMU sensor is not considered, the image processor 120 will guide the forward path based on the direction in which the user gazes (the direction actually detected by the camera 110). To this end, the image processor 120 may generate the virtual Braille block for the forward path by considering information received from the IMU sensor as well. Therethrough, the image processor 120 may generate the virtual Braille block for a movement path, not just a path for the direction in which the user gazes.

In one embodiment of the present disclosure, when the cane detected by the camera 110 is recognized on the generated virtual Braille block, the image processor 120 may transmit recognition information to the cane through the first wireless communication part 150. More specifically, the image processor 120 may continuously receive image information from the camera 110 while the virtual Braille block is generated and may recognize when the cane comes into contact with the virtual Braille block.

Thereafter, when it is recognized that the cane comes into contact with the virtual Braille block, the visually impaired may follow the virtual Braille block through vibration generated from the vibrator mounted in the cane. Accordingly, it is expected that this method will be well accepted by the visually impaired because walking assistance may be provided while still using the touch technique mainly used by the visually impaired.

In addition, the image processor 120 may be included in a controller described later.

The audio output part 130 may output guidance information received from the image processor 120 as voice. The audio output part 130 may receive a signal processed as voice by the controller and output the signal as voice. That is, information about the forward path and the obstacle may be provided as voice guidance through the audio output part 130 in the smart glasses 10.

The first environment setting part 140 may change environment setting of the smart glasses 10 based on setting of a third environment setting part of the smart device.

The first wireless communication part 150 may form a network through wireless communication with the second wireless communication part of the cane and the third wireless communication part of the smart device.

In one embodiment of the present disclosure, the first wireless communication part 150 may transmit recognition information to the cane when the cane detected through the camera is recognized on the virtual Braille block generated by the image processor. In addition, the first wireless communication part 150 may provide an interface for connecting the smart glasses 10 to a wired/wireless network including the Internet. For example, the first wireless communication part 150 may receive content or data provided by the Internet, a content provider, or a network operator, through the network. The first wireless communication part 150 may include a communication module for short-range communication, such as wireless fidelity (Wi-Fi), Bluetooth, Bluetooth low energy (BLE), Zigbee, and near field communication (NFC), or a communication module for cellular communication, such as long-term evolution (LTE), LTE advanced (LTE-A), code division multiple access (CDMA), wideband CDMA (WCDMA), a universal mobile telecommunications system (UMTS), and wireless broadband (WiBro).

Here, the first wireless communication part is termed as such for distinction from the second wireless communication part and the third wireless communication part described later. The first wireless communication part, the second wireless communication part, and the third wireless communication part are the same module and are included in the smart glasses, the cane, and the smart device, respectively.

In one embodiment, the smart glasses 10 may further include the IMU sensor (not illustrated). The IMU sensor may sense 3D position information and rotation information of the camera 110. The image processor 120 may generate the virtual Braille block based on the position information and rotation information of the camera 110 detected from the IMU sensor.

In one embodiment, the smart glasses 10 may output an alarm through the audio output part 130 when the gaze of the user deviates from a first range by a first angle or more based on the 3D position information of the camera 110. This is because visually impaired people have difficulty knowing where to look appropriately since they do not have visual feedback about the direction in which they gaze. In order to solve this problem, one embodiment of the present disclosure determines a gaze direction using the IMU sensor described above.

More specifically, the smart glasses 10 may output the alarm through the sound output part 130 when the gaze of the user deviates from the first range (e.g., an angle at which a non-disabled person looks forward when walking) by the first angle or more (e.g., about 10 degrees) based on the 3D position information of the camera 110. Therethrough, the visually impaired person may correct their gaze according to the alarm output through the sound output part 130 when their gaze falls below or above a reference range while walking.

In particular, the smart glasses 10 may output a low sound through the sound output part 130 when the gaze of the visually impaired person falls below the reference range and may output a high sound through the sound output part 130 when the gaze of the visually impaired person falls above the reference range. Therethrough, the visually impaired person may maintain a constant gaze.

In addition, since navigation applications built into general smart devices are aimed at the non-disabled, it is difficult for the visually impaired to use the navigation applications, and since global positioning system (GPS) manufacturers have developed accuracy and reliability based on open areas, there is a problem that positioning accuracy is low in urban areas.

Further, since existing GPS coordinates have been set for guidance based on vehicle use, an error of the GPS coordinates is large when used for walking. Therefore, in the present disclosure, vehicular GPS coordinates (global route) may be used on the road, and the camera 110 of the smart glasses 10 may be used as coordinates (local route) on a sidewalk.

In addition, the smart glasses 10 may include a controller (not illustrated) that controls the camera 110, the image processor 120, the audio output part 130, the first environment setting part 140, and the first wireless communication part 150. However, for the convenience of explanation, the operation of the controller controlling the camera 110, the image processor 120, the audio output part 130, the first environment setting part 140, and the first wireless communication part 150 will be described as being performed by the smart glasses 10.

Figure 3:
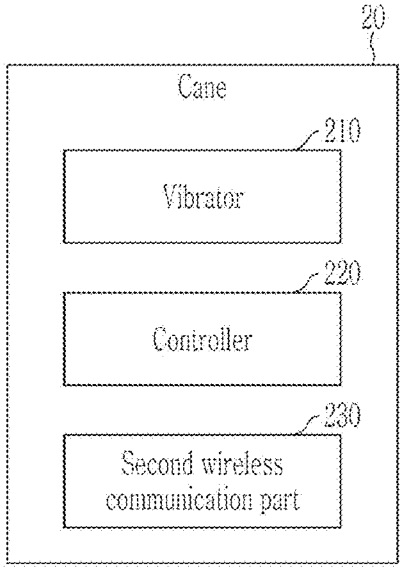
FIG. 3 is a diagram illustrating components of a cane according to an embodiment of the present disclosure.

FIG. 3 is a diagram illustrating components of a cane according to an embodiment of the present disclosure. Hereinafter, a redundant description that overlaps with the above description will be omitted.

Referring to FIG. 3, the cane 20 may include a vibrator 210, a controller 220, a second wireless communication part 230, and a second environment setting part (not illustrated).

The vibrator 210 may output vibration based on recognition information received from the first wireless communication part of the smart glasses. One embodiment of the present disclosure guides the cane 20 to recognize a virtual Braille block by vibration through the vibrator 210 mounted in the cane 20, thereby allowing the visually impaired person to walk along the virtual Braille block.

The controller 220 may generate a control signal based on recognition information of the virtual Braille block received from the second wireless communication part 240 and transmit the control signal to the vibrator 210.

The second wireless communication part 230 may transmit and receive data to and from the smart glasses and the smart device. More specifically, the second wireless communication part 230 may be connected to the first wireless communication part of the smart glasses through wireless communication to receive the recognition information for the virtual Braille block. The second wireless communication part 230 may be connected to the third wireless communication part of the smart device through wireless communication to receive environment setting information and transmit setting information of the cane 20.

The second environment setting part may change environment setting of the cane 20 based on the setting information of the smart device received through the second wireless communication part 230.

In order to compensate for difficulty in recognizing voice of a sound output part of the cane 20 in an environment with a lot of noise, the smart glasses are provided with at least one sound output part related to the ears, and the cane 20 may output vibration.

That is, unlike the prior art, the cane 20 itself may not include many modules, but may only include the vibrator 210 for simply outputting vibration, the controller 220 for controlling the vibrator 210, and the second wireless communication part 230 for transmitting and receiving data to and from the outside.

A cane for the visually impaired is regulated to have a maximum weight of 250 g. If various modules for assisting the visually impaired are included, the weight of the cane becomes heavy. Accordingly, the present disclosure proposes a walking assistance system that uses the cane and the smart glasses together rather than improving the cane itself.

Figure 4:
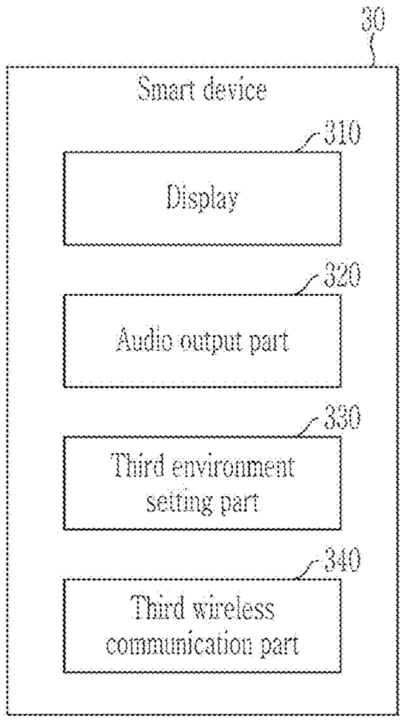
FIG. 4 is a diagram illustrating components of a smart device according to an embodiment of the present disclosure.

FIG. 4 is a diagram illustrating components of a smart device according to an embodiment of the present disclosure. Hereinafter, a redundant description that overlaps with the above description will be omitted.

Referring to FIG. 4, a smart device 30 may include a display 310, an audio output part 320, a third environment setting part 330, and a third wireless communication part 340. The smart device 30 may include a mobile phone, a smartphone, a laptop computer, a digital broadcasting terminal, a personal digital assistant (PDA), a portable multimedia player (PMP), a navigation, a slate PC, a tablet PC, an ultrabook, a wearable device (e.g., a smartwatch, smartglasses, a head mounted display (HMD)), etc.

The display 310 may implement a touchscreen by forming a mutual layer structure with a touch sensor or being formed integrally with touchscreen. This touchscreen may function as a user input part that provides an input interface between the smart device 30 and the user, and at the same time, may provide an output interface between the smart device 30 and the user. However, the present disclosure is for the walking assistance system for the visually impaired, and the display 310 of the smart device 30 is not an essential component. That is, the display 310 is included because the smart device 30 that is generally used is used to implement one embodiment of the present disclosure, and the display 310 is not an essential component.

The audio output part 320 may output audio data received from the third wireless communication part 340 or stored in a memory (not illustrated). In one embodiment of the present disclosure, the audio output part 320 may output audio data related to a function performed based on the control of the controller (not illustrated). Therefore, the audio output part 320 may also be optionally provided with the smart glasses. That is, in one embodiment of the present disclosure, audio data output by the audio output part of the smart glasses may be output from the audio output part 320 of the smart device 30.

The third environment setting part 330 may check and change environment setting of the smart glasses and the cane. More specifically, the user may perform environment setting of the smart glasses and the cane through the third environment setting part 330 of the smart device 30. For example, the user may set sound of the sound output part of the smart glasses, vibration intensity of the cane, and the like through the third environment setting part 330 of the smart device 30.

The third wireless communication part 340 may transmit data about the environment setting changed through the third environment setting part 330 to the smart glasses and the cane. To this end, the third wireless communication part 340 may form a network through wireless communication with the first wireless communication part of the smart glasses and the second wireless communication part of the cane. This is as described above.

In particular, the present disclosure may help the visually impaired to walk more safely and smoothly using each means or in parallel with each means, rather than using all of the means described above.

Figure 5:
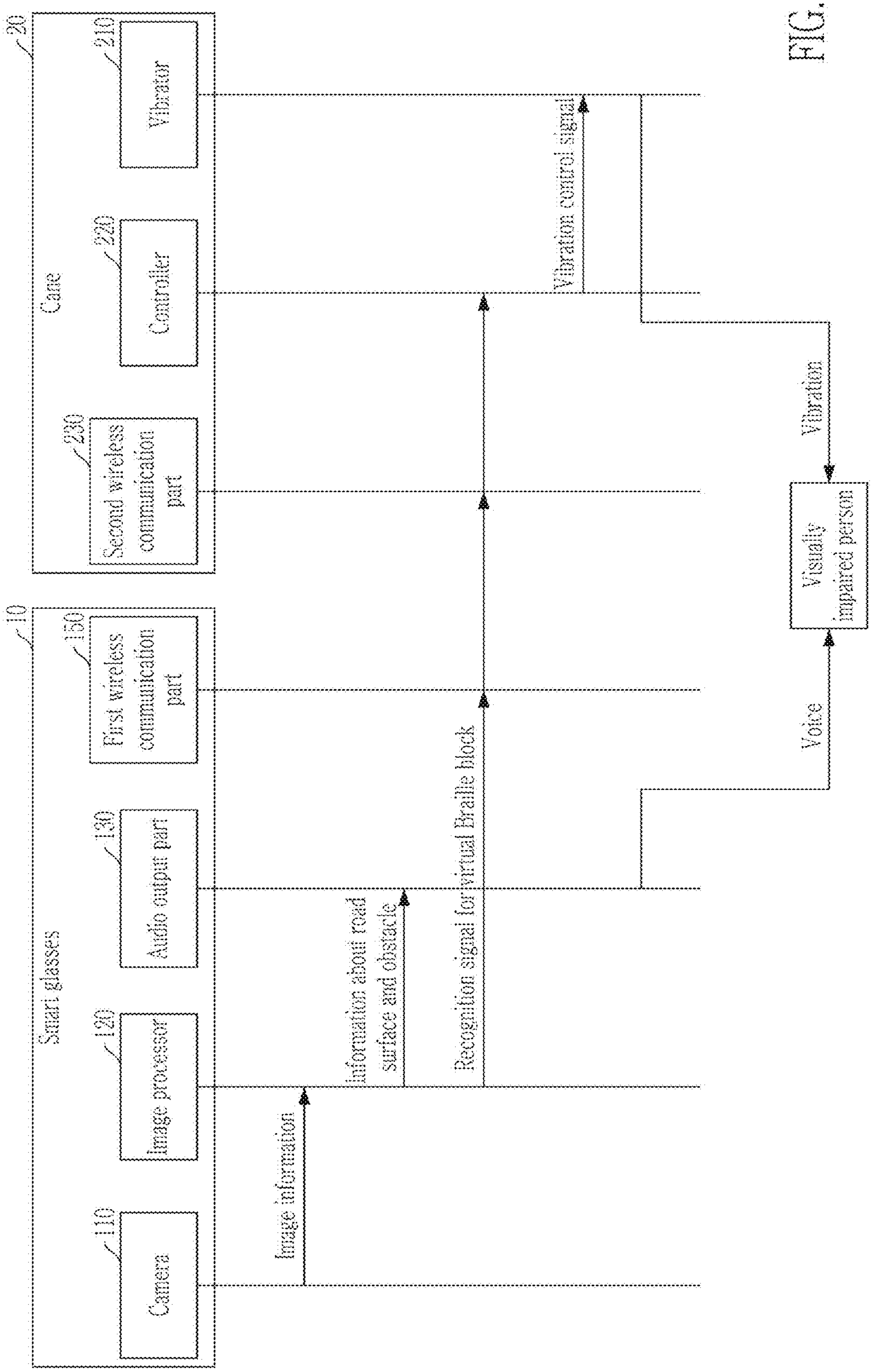
FIG. 5 is a diagram illustrating the operation of a walking assistance system for the visually impaired according to an embodiment of the present disclosure.

FIG. 5 is a diagram illustrating the operation of a walking assistance system for the visually impaired according to an embodiment of the present disclosure. Hereinafter, a redundant description that overlaps with the above description will be omitted.

Referring to FIG. 5, the camera 110 of the smart glasses 30 may transmit image information to the image processor 120. The image processor 120 may transmit information about a road surface and an obstacle to the audio output part 130 and transmit a recognition signal for a virtual Braille block to the second wireless communication part 230 of the cane 20 through the first wireless communication part 150. This will be described in detail in FIG. 6.

The sound output part 130 may output voice guidance to the visually impaired based on the information about the road surface and the obstacle received from the image processor 120. In one embodiment, the smart glasses 30 may output voice guidance such as "There is an obstacle 7 m to 10 m ahead" or "There is an obstacle 5 steps ahead" upon detecting an obstacle. In addition, in one embodiment, the smart glasses 30 may adjust the voice speed of the obstacle guidance through the environment setting part (not illustrated) of the smart device. This is in consideration of the fact that visually impaired people generally hear voice at a faster speed than non-disabled people.

The first wireless communication part 150 may transmit a recognition signal for a virtual Braille block received from the image processor 120 to the cane 20 through the second wireless communication part 230.

The second wireless communication part 230 may transmit the recognition signal for the virtual Braille block received from the first wireless communication part 150 of the smart glasses 30 to the controller 220.

The controller 220 may transmit a vibration control signal to the vibrator 210 based on the recognition signal for the virtual Braille block. Here, the vibration intensity and vibration pattern of the vibration control signal may be set through the environment setting part of the smart device.

The vibrator 210 may output vibration to the visually impaired person based on the vibration control signal received from the controller 220.

Figure 6:
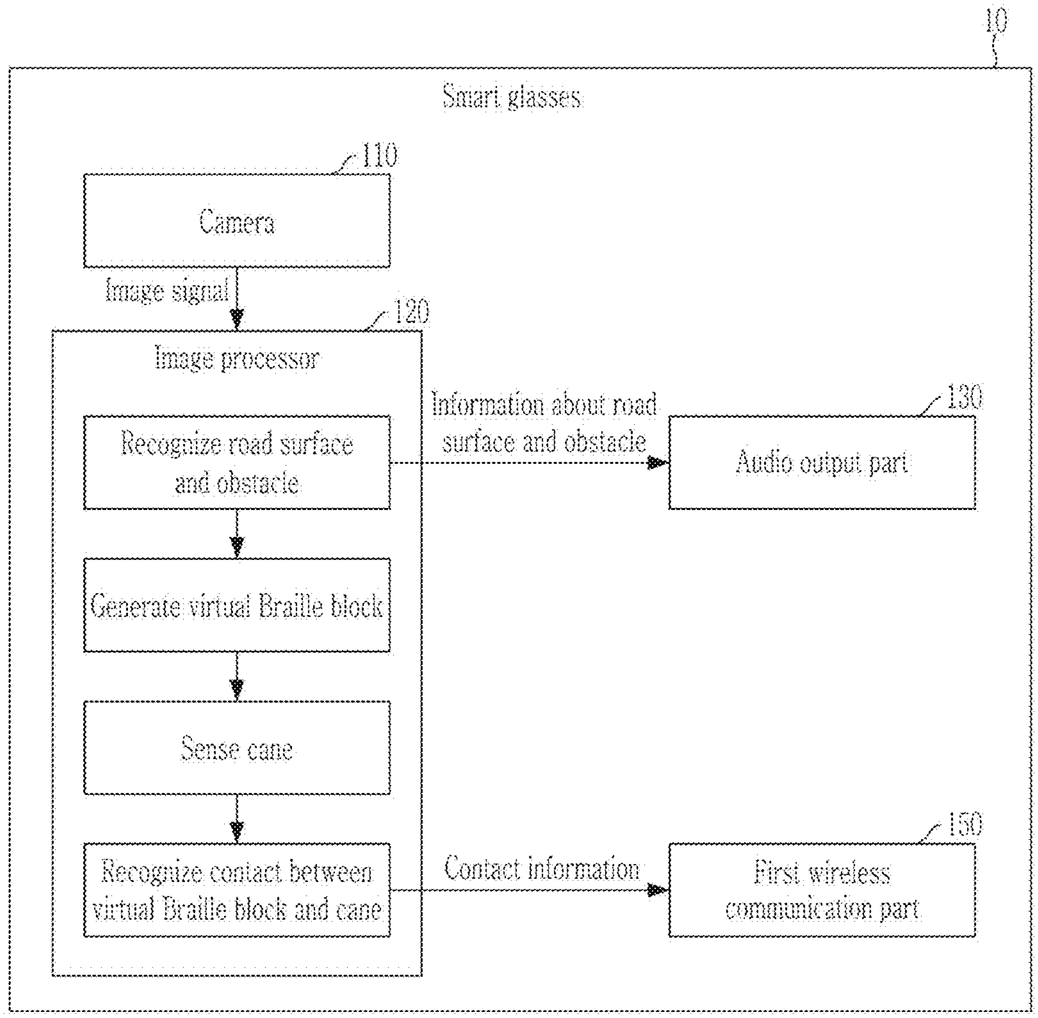
FIG. 6 is a diagram illustrating the operation of smart glasses according to an embodiment of the present disclosure.

FIG. 6 is a diagram illustrating the operation of smart glasses according to an embodiment of the present disclosure. Hereinafter, a redundant description that overlaps with the above description will be omitted.

Referring to FIG. 6, the camera 110 of the smart glasses 10 may transmit an image signal to the image processor 120. In an embodiment of the present disclosure, the image processor 120 may recognize a road surface and an obstacle. Accordingly, the image processor 120 may transmit information about the road surface and the obstacle to the audio output part 130 so that the audio output part 130 may output guidance information.

The image processor 120 may generate a virtual Braille block based on the recognized road surface and obstacle. The image processor 120 may sense a cane through the camera 110. The image processor 120 may recognize contact between the generated virtual Braille block and the sensed cane. Accordingly, the image processor 120 may transmit contact information between the virtual Braille block and the cane to the first wireless communication part 150 so that the first wireless communication part 150 may cause the cane to output vibration.

In one embodiment of the present disclosure, a process of the image processor 120 recognizing the road surface and obstacles and then transmitting the information about the road surface and the obstacle to the audio output part 130 and a process of recognizing contact between the virtual Braille block and the cane and then transmitting the contact information to the first wireless communication part 150 may be performed simultaneously or sequentially.

Figure 7:
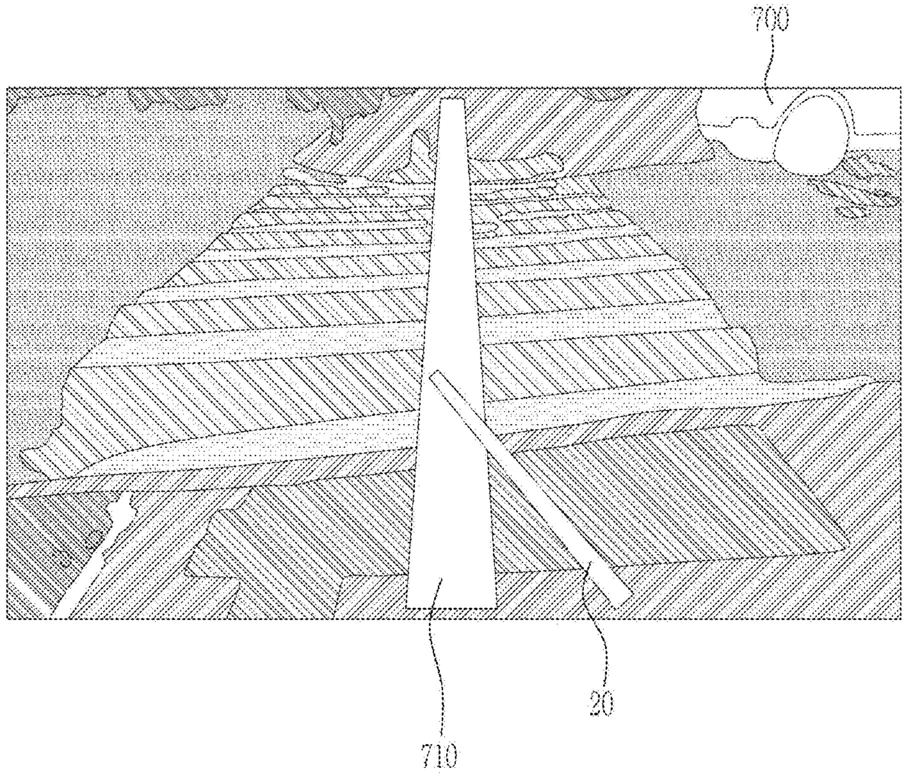
FIG. 7 is a diagram illustrating the operation of an image processor of smart glasses according to one embodiment of the present disclosure.

FIG. 7 is a diagram illustrating the operation of an image processor of smart glasses according to one embodiment of the present disclosure. Hereinafter, a redundant description that overlaps with the above description will be omitted.

Referring to FIG. 7, the image processor of the smart glasses may generate a recognition area 700 based on image information received from the camera. To this end, the image processor may recognize the type of a road surface and the location and type of an obstacle.

In one embodiment, the recognition area 700 may include information about the road surface and the obstacle recognized by the image processor. This will be described in detail in FIGS. 8A and 8B.

In one embodiment, the image processor may generate a virtual Braille block 710 in the recognition area 700. The image processor may generate the virtual Braille block 710 according to a walkable path by considering the type of the road surface and the location of the obstacle in the recognition area 700. Here, the virtual Braille block 710 is virtually generated and is not actually output.

In one embodiment, the image processor may recognize the cane 20 that appears in an image when the visually impaired person uses the touch technique (a method of using a cane to check the road surface and the obstacle by tapping the cane alternately on left and right sides in consideration of the width of the body in a direction the visually impaired person wants to proceed).

The image processor may recognize that the virtual Braille block 710 and the cane 20 overlap within the recognition area 700 and generate a signal indicating that the cane 20 has touched the virtual Braille block 710.

Thereafter, as described above, the image processor may transmit the signal indicating that the cane 20 has touched the virtual Braille block 710 to the cane 20 through the first wireless communication part.

Figure 8A:
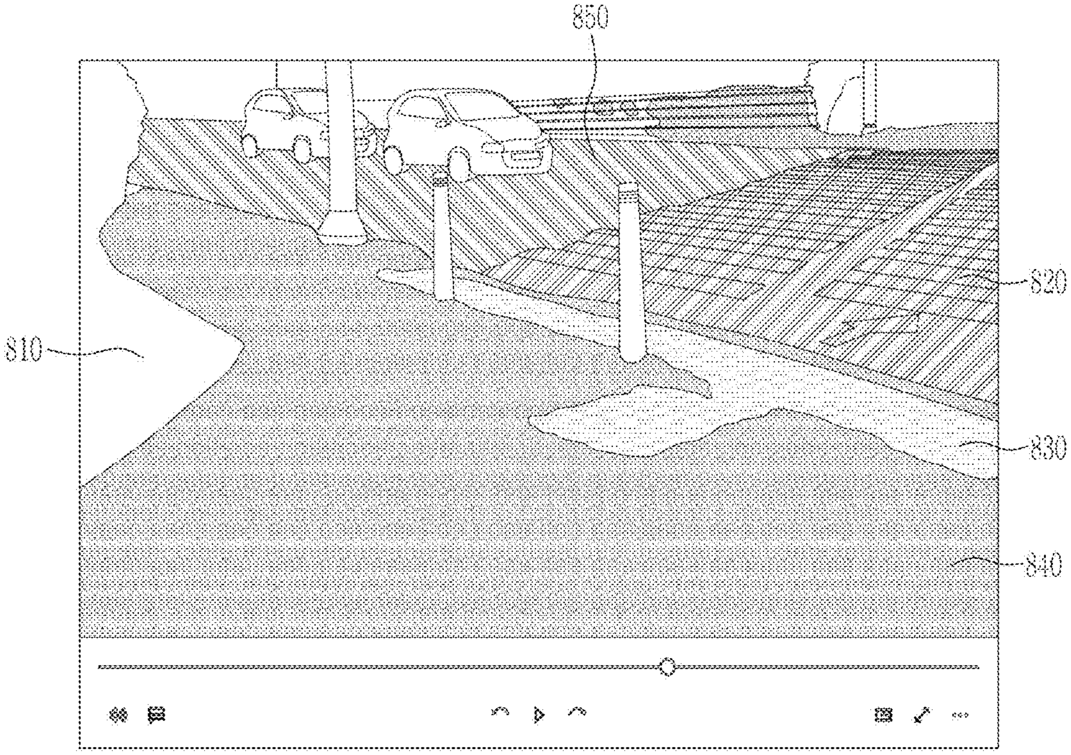
FIGS. 8A and 8B are diagrams illustrating a road surface and an obstacle recognized by an image processor of smart glasses according to an embodiment of the present disclosure.
Figure 8B:
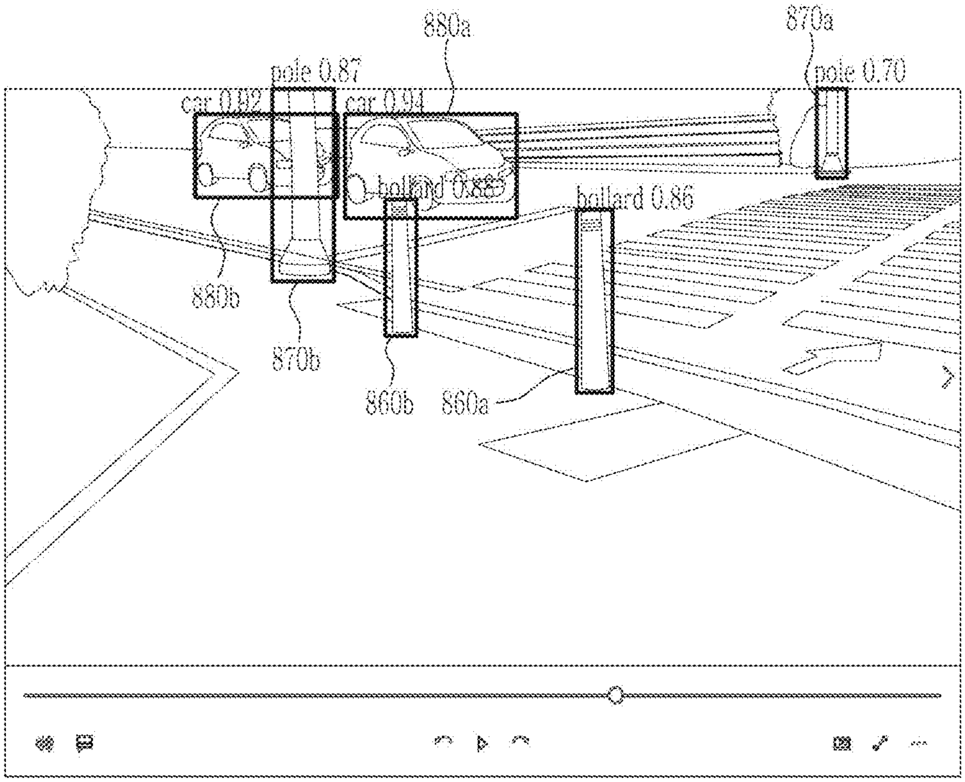

FIGS. 8A and 8B are diagrams illustrating a road surface and an obstacle recognized by an image processor of smart glasses according to an embodiment of the present disclosure. Hereinafter, a redundant description that overlaps with the above description will be omitted.

FIG. 8A illustrates an embodiment of recognizing a road surface such as a sidewalk, a Braille block, a roadway, and a crosswalk, and FIG. 8B illustrates an embodiment of recognizing obstacles such as bollards, vehicles, and pillars (a streetlight, a utility pole, a street tree, etc.).

Referring to FIG. 8A, the image processor of the smart glasses may classify an image received from the camera based on the type of the road surface as in FIG. 8A. For example, the image processor may display a flower bed other than the type of the road surface as a background 810 and represent the flower bed as black, a crosswalk 820 as purple, a Braille block 830 as yellow, a sidewalk 840 as green, and a roadway 850 as blue.

In addition, the image processor may recognize a sidewalk, a crosswalk, a Braille block, a roadway, a caution zone, a bicycle road, and the like as an outdoor road surface and recognize a hallway floor, a Braille block, stairs, an elevator entrance, a door entrance, a wall, and the like as an indoor road surface. In this case, the image processor may use a deep neural network (DNN) model among deep learning models as a surface recognition method.

Referring to FIG. 8B, the image processor of the smart glasses may classify an image received from the camera based on the types of obstacles as illustrated in FIG. 8B. In this case, the image processor may recognize the obstacles by processing the obstacles as bounding boxes. For example, the image processor may recognize bollards 860*a* and 860*b*, utility poles 870*a* and 870*b*, and vehicles 880*a* and 880*b* as bounding boxes and then display the same. In this case, the image processor may use the DNN model among the deep learning models as an obstacle recognition method.

The image processor may recognize a moving object, such as a vehicle or a bicycle, a bollard, a street tree, a pillar, a bench, a parking fee payment machine, a fire hydrant, a barricade, a flower pot, or the like as an outdoor obstacle and recognize a pillar, an entrance door, a circular handle, an elevator, a queue number machine, a ramp handle, or the like as an indoor obstacle. In addition, the image processor may use the DNN model among the deep learning models as a depth estimation method.

Figure 9A:
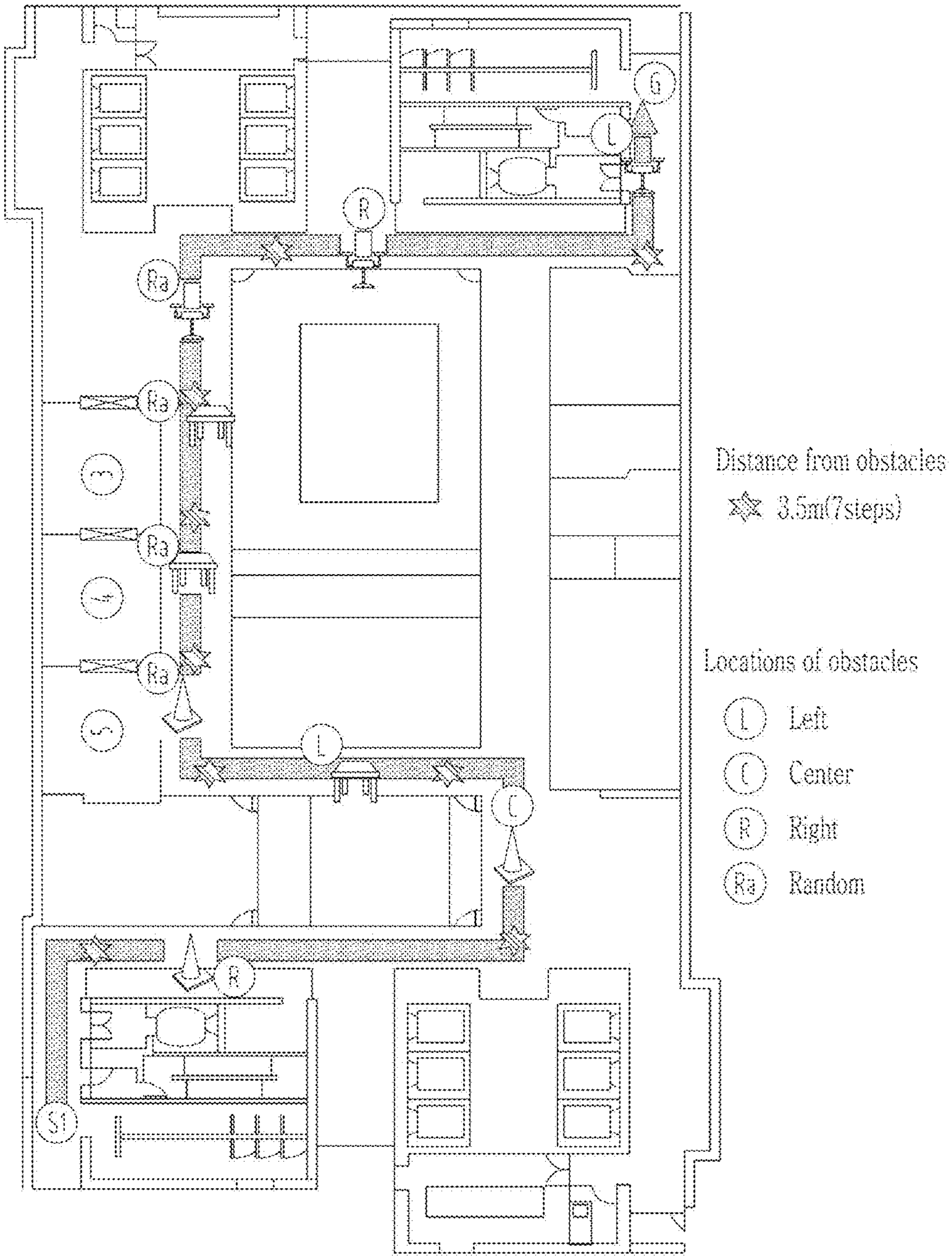
FIGS. 9A and 9B are diagrams illustrating a verification method and result of a walking assistance system for the visually impaired according to an embodiment of the present disclosure.
Figure 9B:
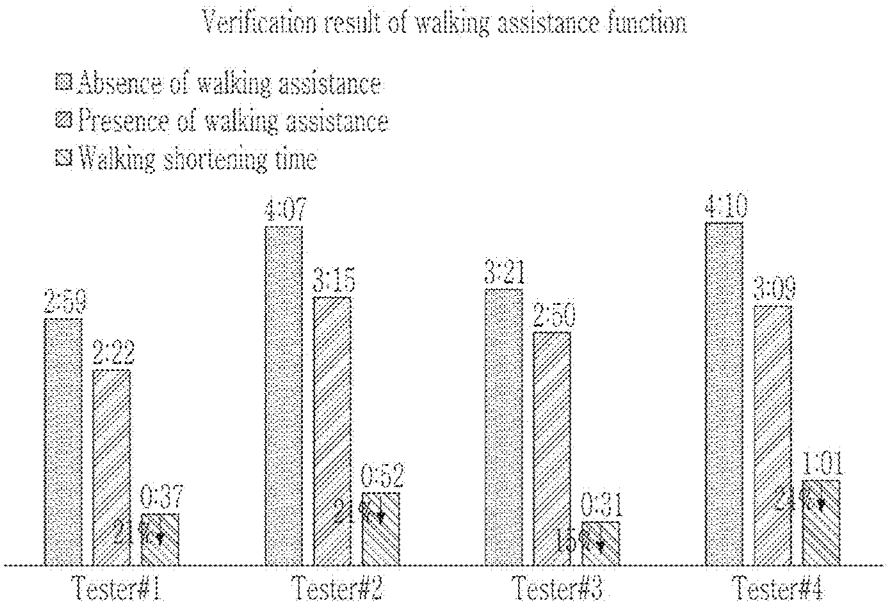

FIGS. 9A and 9B are diagrams illustrating a verification method and result of a walking assistance system for the visually impaired according to an embodiment of the present disclosure. Hereinafter, a redundant description that overlaps with the above description will be omitted.

FIG. 9A is a diagram illustrating a verification method of a walking assistance system for the visually impaired according to an embodiment of the present disclosure, and FIG. 9B is a diagram illustrating a verification result.

Referring to FIG. 9A, in order to verify the walking assistance system for the visually impaired according to one embodiment of the present disclosure, an office corridor of about 80 m was set as an experimental target. A subject wore an eye patch and used the smart glasses and the cane according to one embodiment of the present disclosure and was familiar with a walking method using the cane in advance. In addition, it is assumed that the subject was familiar with a path (turning point) of the experimental target in advance.

There were a total of 9 obstacles, including 3 cones, 3 chairs, and 3 desks. In one embodiment of the present disclosure, the walking assistance system for the visually impaired was set to notify the visually impaired of center, left, and right obstacles 7 steps (about 3.5 m) ahead.

That is, according to one embodiment of the present disclosure, the subject wearing the smart glasses may move along a generated virtual Braille block using the cane, and at the same time, hear guidance information about the obstacles as voice. Accordingly, it may be appreciated that there is an effect of shortening a walking time when walking, as illustrated in FIG. 9B.

More specifically, referring to FIG. 9B, in order to verify the usefulness of walking assistance guidance, information about the obstacles ahead were provided under an assumption that the visually impaired person is familiar with a walking path. As a result, there was an about 20% reduction in the walking time on average.

That is, according to one embodiment of the present disclosure, the visually impaired person may be guided about a walking direction and the locations of obstacles while continuing to maintain the touch technique that they usually use, and thus is expected to be able to walk more safely.

The above-described present disclosure can be implemented as computer-readable code on a computer-readable medium in which a program is recorded. The computer-readable medium can be any type of recording device in which data that can be read by a computer system is stored. Examples of the computer-readable medium include a hard disk drive (HDD), a solid state drive (SSD), a silicon disk drive (SDD), a read only memory (ROM), a random access memory (RAM), a compact disc (CD)-ROM, a magnetic tape, a floppy disk, an optical data storage, and a carrier wave (e.g., data transmission over the Internet). The computer can include the controller. It will be apparent to those skilled in the art that various modifications and variations can be made in the present disclosure without departing from the spirit or scope of the disclosure. The above detailed description is therefore to be construed in all aspects as illustrative and not restrictive. The scope of the present disclosure should be determined by reasonable interpretation of the appended claims and all changes coming within the equivalency range of the present disclosure are intended to be included in the scope of the present disclosure.

INDUSTRIAL APPLICABILITY

The present disclosure may be implemented repeatedly and thus has industrial applicability.

The invention claimed is:

1. A walking assistance system for visually impaired, the walking assistance system comprising:

smart glasses configured to be worn by a user, including a camera, an image processor, an audio output part, and a first wireless communication part; and a cane including a vibrator and a second wireless communication part, wherein the camera is configured to acquire image information about a forward path, wherein the image processor is configured to:

analyze a type of the forward path and a type of an obstacle based on the image information, generate guidance information related to the type of the forward path and the type of the obstacle, output the guidance information through the audio output part, and generate a virtual Braille block for avoiding the obstacle based on a result of analysis, wherein the first wireless communication part is configured to transmit recognition information to the cane when the cane is located on the virtual Braille block for avoiding the obstacle, and wherein the vibrator of the cane is configured to output vibration based on the recognition information.

2. The walking assistance system for the visually impaired according to claim 1, wherein the smart glasses further include an inertial measurement unit (IMU) sensor, wherein the IMU sensor senses three-dimensional position information and rotation information of the camera, and wherein the image processor generates the virtual Braille block based on the three-dimensional position information and the rotation information of the camera sensed by the IMU sensor.

3. The walking assistance system for the visually impaired according to claim 2, wherein the smart glasses output an alarm through the sound output part based on gaze of the user deviating from a first range by a first angle or more based on the three-dimensional position information of the camera.

4. The walking assistance system for the visually impaired according to claim 1, wherein the image processor generates the virtual Braille block by coloring the type of the forward path based on a predetermined criterion.

5. The walking assistance system for the visually impaired according to claim 1, wherein the image processor analyzes the type of the obstacle based on a bounding box related to the obstacle.

6. The walking assistance system for the visually impaired according to claim 1, wherein the smart glasses receive global positioning system (GPS) information from an external server through the first wireless communication part and generate the virtual Braille block based on the GPS information.

7. The walking assistance system for the visually impaired according to claim 1, further comprising a smart device including a third wireless communication part and an environment setting part, wherein the user sets functions of the smart glasses and the cane through the environment setting part, and wherein the smart device transmits the set functions to the smart glasses and the cane through the third wireless communication part.

8. A walking assistance method for visually impaired in a walking assistance system for the visually impaired, the walking assistance system including smart glasses wearable by a user, which include a camera, an image processor, an audio output part, and a first wireless communication part, and a cane, which includes a vibrator and a second wireless communication part, the walking assistance method comprising:

acquiring image information about a forward path through the camera;

analyzing a type of the forward path and a type of an obstacle based on the image information;

generating guidance information related to the type of the forward path and the type of the obstacle;

outputting the guidance information through the audio output part;

generating, by the smart glasses, a virtual Braille block for avoiding the obstacle based on a result of analysis;

transmitting recognition information from the smart glasses to the cane during the cane being located on the virtual Braille block for avoiding the obstacle; and outputting, by the vibrator of the cane, vibration based on the recognition information.

* * * * *